United States Patent
Silitonga

(10) Patent No.: US 10,931,214 B2
(45) Date of Patent: Feb. 23, 2021

(54) MOTOR UNIT

(71) Applicant: NIDEC SERVO CORPORATION, Kiryu (JP)

(72) Inventor: Charles Simson Halason Silitonga, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 50 days.

(21) Appl. No.: 16/273,189

(22) Filed: Feb. 12, 2019

(65) Prior Publication Data

US 2019/0305701 A1    Oct. 3, 2019

(30) Foreign Application Priority Data

Mar. 30, 2018   (JP) .............................. JP2018-067904

(51) Int. Cl.
*H02P 6/20*   (2016.01)
*H02P 6/28*   (2016.01)

(52) U.S. Cl.
CPC . *H02P 6/20* (2013.01); *H02P 6/28* (2016.02)

(58) Field of Classification Search
CPC ................................... H02P 6/20; H02P 6/28
USPC ......................................................... 318/490
See application file for complete search history.

(56) References Cited

U.S. PATENT DOCUMENTS

| | | | | |
|---|---|---|---|---|
| 6,593,719 B2* | 7/2003 | Satta | ........................ | H02P 1/00 318/609 |
| 8,618,754 B2* | 12/2013 | Maeda | .................. | H02P 7/2855 318/400.01 |
| 2009/0128065 A1* | 5/2009 | Hsu | .......................... | G05B 7/02 318/163 |
| 2010/0220982 A1* | 9/2010 | Maeda | ............... | G03G 15/1615 388/811 |
| 2011/0043157 A1* | 2/2011 | Yuasa | .................. | B60N 2/0232 318/599 |
| 2011/0043158 A1* | 2/2011 | Yuasa | .................. | B60N 2/0232 318/599 |
| 2012/0249036 A1* | 10/2012 | Iesaki | ....................... | H02P 1/16 318/430 |
| 2013/0070014 A1* | 3/2013 | Iesaki | ...................... | B41J 11/42 347/16 |
| 2013/0193894 A1* | 8/2013 | Kiguchi | ................... | H02P 3/00 318/490 |
| 2013/0200833 A1* | 8/2013 | Yoo | ........................ | H02P 29/20 318/445 |
| 2013/0200834 A1* | 8/2013 | Kim | ....................... | D06F 33/00 318/445 |
| 2015/0042247 A1* | 2/2015 | Kusakawa | ............... | B25F 5/00 318/139 |

(Continued)

FOREIGN PATENT DOCUMENTS

JP    2001-103776 A    4/2001

*Primary Examiner* — Kawing Chan
(74) *Attorney, Agent, or Firm* — Keating & Bennett

(57) ABSTRACT

A motor unit includes a motor, a controller that outputs a pulse signal, a driver that supplies a drive current to the motor based on the pulse signal, and a detector that determines an actual rotation number of the motor. The controller includes calculators that calculate control values of a rotation number of the motor, and control stages. The controller also includes a pulse generator that selects one of the control values calculated by the calculators to generate the pulse signal based on the control value selected, at each of the control stages.

10 Claims, 3 Drawing Sheets

(56) References Cited

U.S. PATENT DOCUMENTS

| | | | |
|---|---|---|---|
| 2015/0128660 A1* | 5/2015 | Jung | D06F 37/304 |
| | | | 68/3 R |
| 2015/0128662 A1* | 5/2015 | Kim | H02P 6/20 |
| | | | 68/3 R |
| 2015/0222211 A1* | 8/2015 | Maruo | H02P 23/0027 |
| | | | 318/612 |
| 2015/0303839 A1* | 10/2015 | Ueno | H02P 6/24 |
| | | | 318/400.22 |
| 2016/0134223 A1* | 5/2016 | Amagasa | H02P 6/06 |
| | | | 318/432 |
| 2016/0294312 A1* | 10/2016 | Tsumura | H02M 5/458 |
| 2019/0190411 A1* | 6/2019 | Kamio | H02P 6/28 |

* cited by examiner

MOTOR UNIT

CROSS REFERENCE TO RELATED APPLICATIONS

This application claims the benefit of priority to Japanese Patent Application No. 2018-067904 filed on Mar. 30, 2018. The entire contents of this application are hereby incorporated herein by reference.

BACKGROUND OF THE INVENTION

1. Field of the Invention

The present disclosure relates to a motor unit.

2. Description of the Related Art

In a motor, typically an actual rotation number of the motor is fed back, and rotation control is performed such that the actual rotation number converges to a target rotation number. PID control is known as the feedback control. For example, in the PI control, proportional control and integral control are performed based on a difference between the target rotation number and the actual rotation number, thereby setting a control voltage of the motor. A sensor, such as a Hall element and an encoder, which detects a rotation angle of the motor, is used to detect the actual rotation number of the motor.

In starting the motor, the difference between the target rotation number and the actual rotation number is large because the rotation number is increased from zero. In a state in which the rotation number is low, sometimes a detection error and a detection delay of the actual rotation number increase depending on resolution of the sensor used. For this reason, when the feedback control is performed by the actual rotation number at a beginning of the starting, overshoot in which the rotation number increases rapidly is generated, and sometimes an impact is made on the motor. Once the rotation number increases, the only solution is to wait for natural deceleration. Consequently, a starting time in which the motor is started and then reaches the final target rotation number may be prolonged because the rotation number is not stabilized.

SUMMARY OF THE INVENTION

According to an illustrative embodiment of the present disclosure, a motor unit includes a motor, a controller that outputs a pulse signal controlling a rotation number of the motor, a driver that supplies a drive current to the motor based on the pulse signal, and a detector that determines an actual rotation number of the motor. The controller includes a plurality of calculators that calculate control values of the rotation number of the motor and a pulse generator including a plurality of control stages in a period in which the motor is started and then reaches a final target rotation number, the pulse generator selecting one of the control values calculated by the plurality of calculators at each of the control stages to generate the pulse signal based on the control value selected. The plurality of calculators include a first calculator that calculates the control value increasing the rotation number with a constant pattern with the control value rotating the motor at a first target rotation number smaller than the final target rotation number as an upper limit, and the pulse generator selects the control value calculated by the first calculator at a first stage immediately after the starting of the motor.

The above and other elements, features, steps, characteristics and advantages of the present disclosure will become more apparent from the following detailed description of the illustrative embodiments with reference to the attached drawings.

DETAILED DESCRIPTION OF THE PREFERRED EMBODIMENTS

Hereinafter, a motor unit according to an illustrative embodiment of the present disclosure will be described with reference to the drawings.

Figure 1:
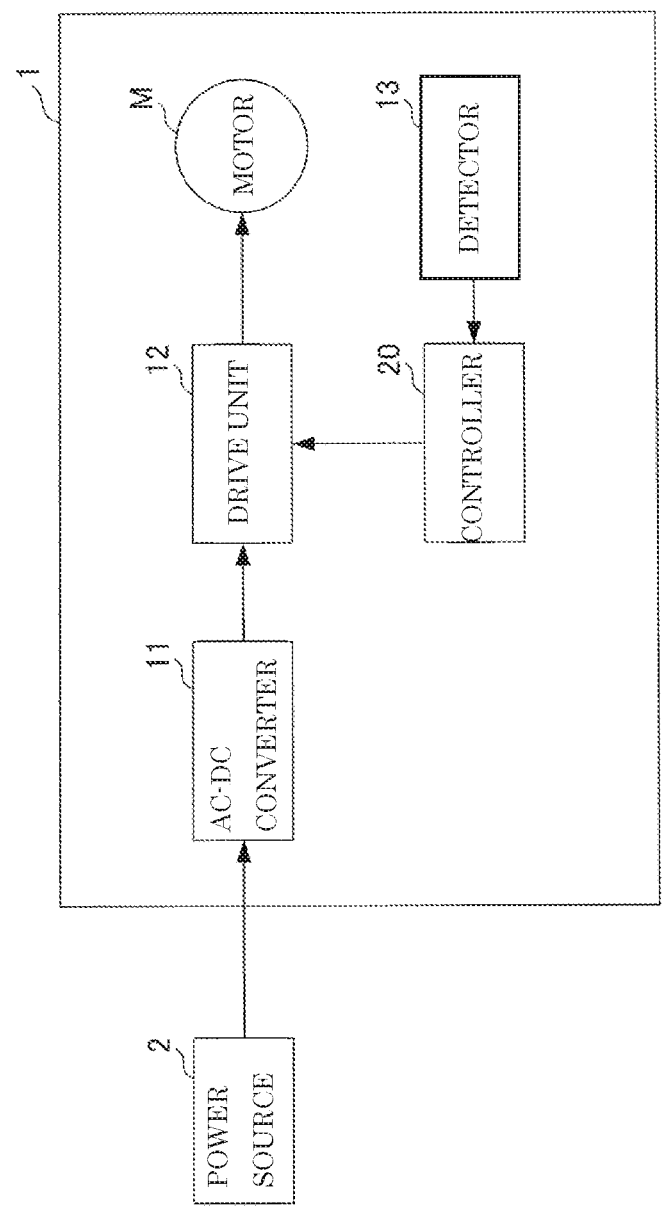
FIG. 1 is a block diagram illustrating a functional configuration of a motor unit according to an illustrative embodiment of the present disclosure.

FIG. 1 illustrates a configuration of a motor unit 1 according to the embodiment of the present disclosure.

As illustrated in FIG. 1, the motor unit 1 includes an AC-DC converter 11, a drive unit 12, a detector 13, a controller 20, and a motor M. The motor unit 1 is connected to a power source 2 that is an external power source, and receives an AC voltage from the power source 2.

The motor M of the embodiment is a three-phase brushless direct current (DC) motor. The motor M includes coils of a U-phase, a V-phase and a W-phase. When a drive current is supplied to the coil of each phase, torque is generated between a stator and a rotor, and the rotor rotates.

The AC-DC converter 11 converts an alternating current (AC) voltage supplied from the power source 2 into a direct current (DC) voltage. The AC-DC converter 11 can drive the motor M using AC power.

The drive unit 12 includes an inverter circuit, and supplies the drive current to the motor M based on a pulse signal output from the controller 20. For example, three arms corresponding to the phases of the motor M are bridge-connected in the inverter circuit. Each arm includes upper and lower switching elements connected in series. The inverter circuit supplies the drive current having an AC voltage waveform to each phase of the motor M by switching between turn-on and turn-off of the upper and lower switching elements of each arm based on the pulse signal.

Detector

The detector 13 detects a rotation angle of the motor M. For example, a Hall element, an encoder, or a resolver can be used as the detector 13. In the embodiment, an example in which the Hall element is used as the detector 13 will be described.

Controller

The controller 20 outputs the pulse signal controlling the rotation number of the motor M. For example, a processor such as a central processing unit (CPU) or a computer such as a microcomputer can be used as the controller 20.

Figure 2:
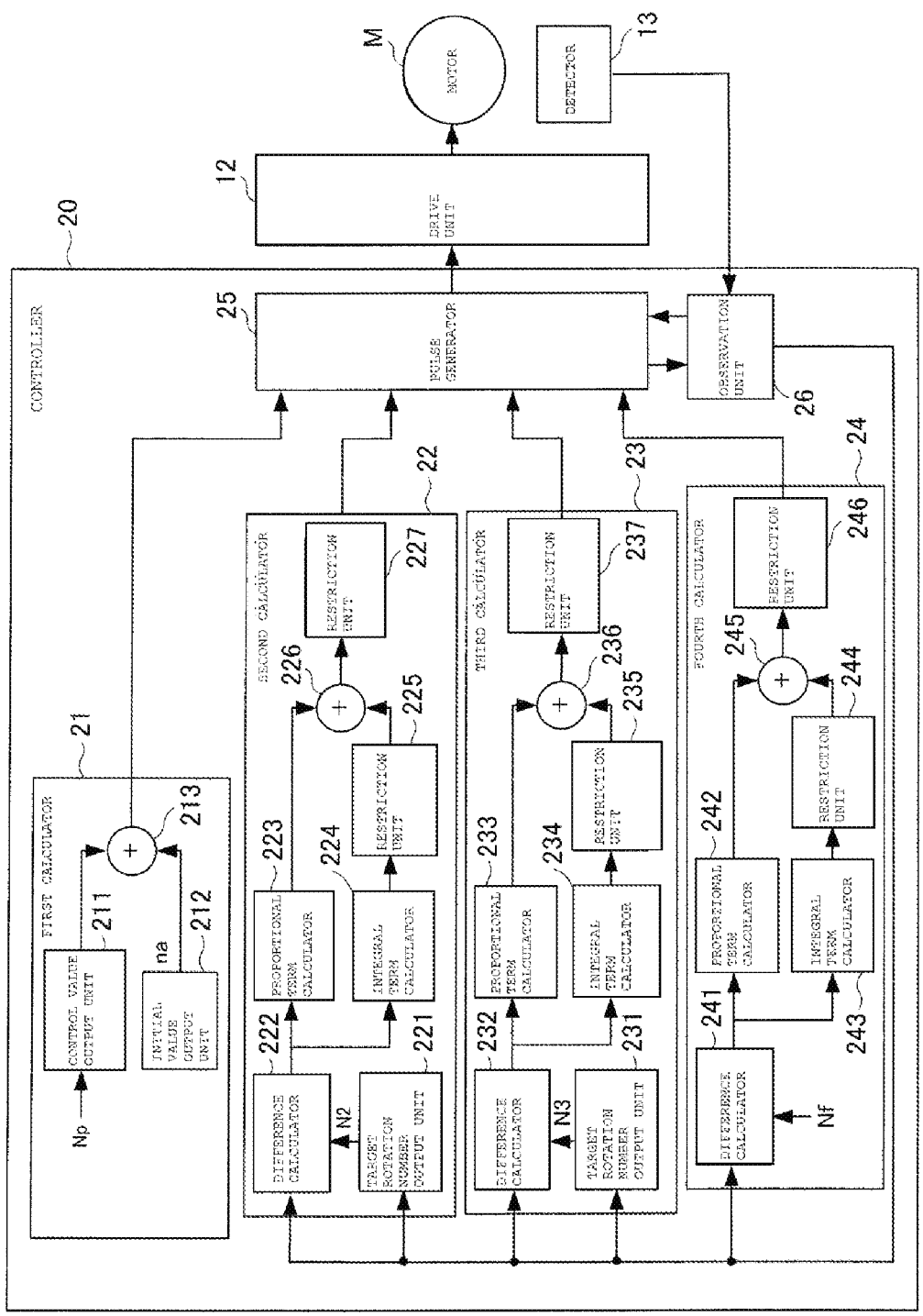
FIG. 2 is a block diagram illustrating a functional configuration of a controller in FIG. 1.

FIG. 2 illustrates a configuration of the controller 20.

As illustrated in FIG. 2, the controller 20 includes four calculators that calculate a control value of the rotation number of the motor M, namely, a first calculator 21, a second calculator 22, a third calculator 23, and a fourth calculator 24.

The controller 20 includes a pulse generator 25 and an observation unit 26. The pulse generator 25 generates the pulse signal based on one of the control values calculated by the first calculator 21, the second calculator 22, the third calculator 23, and the fourth calculator 24. In the embodiment, the pulse generator 25 generates the pulse signal of a pulse width modulation (PWM) system. Each of the calculators 21 to 24 calculates a duty ratio of the pulse signal as the control value of the rotation number.

Observation Unit

The observation unit 26 observes the actual rotation number of the motor M and outputs the actual rotation number to the calculators 21 to 24. In the embodiment, the observation unit 26 observes the actual rotation number by calculating the actual rotation number of the motor M at regular intervals based on a detection signal output from the detector 13. Specifically, since three Hall elements disposed as the detector 13 between the coils output the detection signal of strength of a magnetic field, the observation unit 26 detects a change in rotation angle from the detection signal that is a set of three detection signals output from the Hall elements. The observation unit 26 calculates an amount of the change in rotation angle per unit time as the actual rotation number of the motor M. The detection signals of the three Hall elements are one set by way of example. However, the number of Hall elements as one set is not limited to this, but the number of Hall elements according to the configuration of the motor M can be used.

The observation unit 26 outputs an effective signal to a calculator that calculates the control value used to generate the pulse signal out of the calculators 21 to 24.

In the embodiment, the observation unit 26 is provided in the controller 20. Alternatively, the observation unit 26 may be configured separately from the controller 20.

First Calculator

The first calculator 21 calculates the duty ratio increasing the rotation number with a constant pattern with the duty ratio with which the motor M is rotated at a first target rotation number N1 as an upper limit. The first target rotation number N1 is a rotation number smaller than a final target rotation number Nf. The final target rotation number Nf is a target rotation number that is set as a constant rotation number after starting of the motor M.

As illustrated in FIG. 2, the first calculator 21 includes a control value output unit 211, an initial value output unit 212, and an adder 213.

A pattern Np in which the duty ratio increases according to an elapsed time from the starting of the motor M is input to the control value output unit 211. As the upper limit of the duty ratio, the duty ratio when the motor M is rotated at the first target rotation number N1 is set to the pattern Np as the upper limit of the duty ratio. As long as the rotation number of the motor M increases gradually, the pattern Np may be a pattern in which the duty ratio increases linearly, or a pattern, such as a sigmoid curve and an exponential function curve, in which the duty ratio increases in a curve shape. The control value output unit 211 acquires the duty ratio corresponding to the elapsed time from the starting from the pattern Np, and outputs the duty ratio. The pattern Np instructed from an outside may be input to the control value output unit 211, or the pattern Np stored in a memory may be read by the control value output unit 211.

The initial value output unit 212 outputs an initial value na of the duty ratio. The adder 213 adds the initial value na to the duty ratio output from the control value output unit 211, and outputs the addition result. The duty ratio output by the pattern Np can be increased by adding the initial value na. In the case that the motor M is accelerated from a state of the rotation number of zero or a low speed even in the identical acceleration of the rotation number, the acceleration is slower than that case that the motor M is accelerated from the state in which the rotation number increases to some extent. Thus, the initial value na is added to increase the duty ratio, which allows shortening of a starting time required from the starting to the final target rotation number Nf. Even if the acceleration varies depending on a characteristic of the motor M, the time can be adjusted by a simple operation that changes only the setting of the initial value na, and the adjustment is easy to perform.

Second Calculator

The second calculator 22 calculates a sum of a proportional term and an integral term of a difference between a second target rotation number N2 and the actual rotation number of the motor M input from the observation unit 26 as the duty ratio. The second target rotation number N2 is a rotation number greater than or equal to the first target rotation number N1 and smaller than the final target rotation number Nf.

As illustrated in FIG. 2, the second calculator 22 includes a target rotation number output unit 221, a difference calculator 222, a proportional term calculator 223, an integral term calculator 224, a restriction unit 225, an adder 226, and a restriction unit 227.

When the effective signal and the actual rotation number are input by the observation unit 26, the target rotation number output unit 221 outputs the previously-set second target rotation number N2. In the case that the actual rotation number input together with the first effective signal does not reach the first target rotation number N1, the target rotation number output unit 221 adds a difference obtained by subtracting the actual rotation number from the first target rotation number N1 to the second target rotation number N2, and outputs the addition result.

The motor M can be accelerated from the low speed rotation state by adding the rotation number lacking for the first target rotation number N1 to the second target rotation number N2.

The difference calculator 222 calculates a difference between the second target rotation number N2 output from the target rotation number output unit 221 and the actual rotation number input from the observation unit 26.

The proportional term calculator 223 calculates the proportional term by multiplying the difference calculated by the difference calculator 222 by a proportional coefficient.

The integral term calculator 224 multiplies the difference calculated by the difference calculator 222 by an integral coefficient to perform integration, thereby calculating the integral term.

In the case that the integral term calculated by the integral term calculator 224 exceeds the upper limit set to the integral term, the restriction unit 225 restricts the integral term to the upper limit. The upper limit of the integral term that tends to cause the overshoot in which the rotation number increases rapidly is restricted to avoid a rapid increase in duty ratio, which allows the rotation number to be effectively suppressed from rapidly increasing at a beginning of starting. Any upper limit can be set. For example, when the rotation is controlled by the duty ratio calculated using different integral terms, the integral term in which the overshoot is not generated can experimentally be obtained, and set as the upper limit.

The restriction unit 225 can also restrict the integral term using a lower limit that increases stepwise with respect to the integral term. Specifically, the restriction unit 225 outputs the lower limit in the case that the calculated integral term is lower than the lower limit. The undershoot in which the duty ratio decreases rapidly can be avoided by restricting the lower limit. A fluctuation range of the duty ratio decreases by restricting the integral term by both the upper limit and the lower limit that increases stepwise. The fluctuation range of the rotation number of the motor M is restricted, so that a delay of reaction of the motor M with respect to the pulse signal can be suppressed.

The adder 226 calculates the sum of the proportional term calculated by the proportional term calculator 223 and the integral term calculated by the integral term calculator 224. The calculated sum is the duty ratio. In the embodiment, because the integral term is restricted by the restriction unit 225, the adder 226 adds the restricted integral term to the proportional term.

The following equation represents a calculation expression of the duty ratio.

$$u(t) = Kp \cdot e(t) + Ki \cdot \int e(t) dt$$

In the above equation, u(t) represents the duty ratio at time t. Kp and Ki represent a proportional coefficient and an integral coefficient, respectively. e(t) represents a difference between the target rotation number and the actual rotation number at the time t. $\int e(t\, dt$ represents an integral value of the difference e(t) up to the time t.

In the case that the duty ratio calculated by the adder 226 exceeds the upper limit for the duty ratio, the restriction unit 227 restricts the duty ratio to the upper limit. The rapid increase of the PI-controlled duty ratio can be suppressed, and the rapid increase of the rotation number at the beginning of the starting can be suppressed. Any upper limit can be set. For example, when the rotation is controlled by the different duty ratios, the duty ratio with which the overshoot is not generated can experimentally be obtained, and set as the upper limit. Similarly to the restriction unit 225, the restriction unit 227 can restrict the calculated duty ratio to the lower limit by the lower limit that increases stepwise.

Third Calculator

The third calculator 23 calculates the sum of the proportional term and the integral term of the difference between a third target rotation number N3 and the actual rotation number input from the observation unit 26 as the duty ratio. The third target rotation number N3 is a rotation number that increases stepwise with the final target rotation number Nf as the upper limit.

As illustrated in FIG. 2, the third calculator 23 includes a target rotation number output unit 231, a difference calculator 232, a proportional term calculator 233, an integral term calculator 234, a restriction unit 235, an adder 236, and a restriction unit 237.

When the effective signal and the actual rotation number are input from the observation unit 26, the target rotation number output unit 231 calculates the third target rotation number N3 that increases stepwise from the actual rotation number to the final target rotation number Nf, and outputs the calculation result. For example, the target rotation number output unit 231 can output the third target rotation number N3 that increases at 16 steps.

The difference calculator 232 calculates the difference between the third target rotation number N3 output from the target rotation number output unit 231 and the actual rotation number input from the observation unit 26.

The proportional term calculator 233, the integral term calculator 234, the restriction unit 235, the adder 236, and the restriction unit 237 calculate the duty ratio from the difference calculated by the difference calculator 232 similarly to the proportional term calculator 223, the integral term calculator 224, the restriction unit 225, the adder 226, and the restriction unit 227 of the second calculator 22. The proportional coefficient and the integral coefficient used by the proportional term calculator 233 and the integral term calculator 234 may be a proportional coefficient and an integral coefficient that are different from those of the second calculator 22. The time until the motor M reaches the final target rotation number Nf can be shortened by setting a coefficient suitable for acceleration to the third target rotation number N3.

Fourth Calculator

The fourth calculator 24 calculates the sum of the proportional term and the integral term of the difference between the final target rotation number Nf and the actual rotation number input from the observation unit 26 as the duty ratio.

As illustrated in FIG. 2, the fourth calculator 24 includes a difference calculator 241, a proportional term calculator 242, an integral term calculator 243, a restriction unit 244, an adder 245, and a restriction unit 246.

The difference calculator 241 calculates the difference between the final target rotation number Nf and the actual rotation number input from the observation unit 26.

The proportional term calculator 242, the integral term calculator 243, the restriction unit 244, the adder 245, and the restriction unit 246 calculate the duty ratio from the difference calculated by the difference calculator 241 similarly to the proportional term calculator 223, the integral term calculator 224, the restriction unit 225, the adder 226, and the restriction unit 227 of the second calculator 22. The proportional coefficient and the integral coefficient used by the proportional term calculator 242 and the integral term calculator 243 may be a proportional coefficient and an integral coefficient that are different from those of the second calculator 22 and the third calculator 23. The time necessary for the convergence can be shortened by setting a coefficient suitable for the convergence to the final target rotation number Nf.

Because a rotation characteristic depends on an individual motor, the first target rotation number N1, the second target rotation number N2, the final target rotation number Nf, and the initial value na may be set according to the experimentally-obtained rotation characteristic of the motor M. For example, the first target rotation number N1 and the second target rotation number N2 can be set by experimentally obtaining the rotation number at which the overshoot is not generated even when rotation is started from the non-rotating state or the low speed rotation state. The second target rotation number N2 is preferably a rotation number at which detection accuracy of the detector 13 can be guaranteed. Consequently, in a step of increasing the rotation number from a vicinity of the second target rotation number N2 to the final target rotation number Nf, the rotation can be controlled by the actual rotation number having few detection errors and few detection delays, and the overshoot due to the detection error can effectively be prevented.

For example, the rotation number at the duty ratio of 80% can be set as the final target rotation number Nf to the duty ratio of 100% at the maximum rotation number of the motor M. In this case, the rotation number at the duty ratio of 5 to 15% can be set as the first target rotation number N1, and the duty ratio of 1 to 5% can be set as the initial value na. In the case that the initial value na is not added, the initial value na may be set to 0%. The rotation number at the duty ratio of 15 to 25% can be decided as the second target rotation number N2.

Pulse Generator

The pulse generator 25 of the embodiment has four control stages in a period in which the motor M is started and then reaches the final target rotation number Nf, and selects one of the duty ratios calculated by the calculators 21 to 24 at each of the control stages. The pulse generator 25 generates the pulse signal based on the selected one duty ratio.

First Stage

At a first stage immediately after the starting of the motor M, the pulse generator 25 selects the control value calculated by the first calculator 21. Consequently, immediately after the starting, the pulse signal is generated with the duty ratio increasing with a constant pattern with the first target rotation number N1 as the upper limit, so that the rotation number can gradually be increased by the pattern Np. In the no-rotating state or the low speed rotation state at the beginning of the starting, although the detection error or the detection delay of the actual rotation number tends to be large, the actual rotation number is not fed back to the calculation of the duty ratio at the first stage, so that the rapid increase of the rotation number due to the difference between the final target rotation number Nf and the actual rotation number or the detection error or the detection delay of the actual rotation number can be avoided.

Second Stage

In the embodiment, the pulse generator 25 selects the duty ratio calculated by the second calculator 21 at a second stage subsequent to the first stage. When switching from the first stage to the second stage is performed in the pulse generator 25, the observation unit 26 outputs the effective signal to the second calculator 22. The observation unit 26 observes the actual rotation number at the time of switching, and outputs the actual rotation number together with the effective signal.

The timing of switching from the first stage to the second stage can arbitrarily be decided. For example, the pulse generator 25 can switch to the second stage in the timing of reaching the first target rotation number N1. In this case, the rotation number can be increased stepwise from the first target rotation number N1 to the second target rotation number N2.

The pulse generator 25 can switch from the first stage to the second stage when a certain time elapses since the starting of the motor M. In this case, the starting time from the starting to stabilization to the final target rotation number Nf can be preferably shortened by switching to the second stage irrespective of whether the motor M reaches the first target rotation number N1.

The certain time in switching from the first stage to the second stage can be set to time identical to a time interval during which the rotation control is performed by the duty ratio, namely, a time interval during which the actual rotation number is observed by the observation unit 26. For example, in the case that the pulse signal has a frequency of 20 kHz while the time interval during which the duty ratio of one pulse, namely, the pulse signal is controlled is 50 msec, the first stage may be switched to the second stage in 50 msec after the motor M is started to start the first stage. With this time setting, the first stage is a time interval from the starting of the motor M to the first control of the duty ratio of the pulse signal, so that the duty ratio can be increased with a constant pattern irrespective of the actual rotation number during a time interval immediately after the starting in which the actual rotation number is unknown.

Third Stage

In the embodiment, the pulse generator 25 selects the duty ratio calculated by the third calculator 23 at a third stage subsequent to the second stage, and generates the pulse signal based on the selected duty ratio. When switching from the second stage to the third stage is performed in the pulse generator 25, the observation unit 26 outputs the effective signal to the third calculator 23. The observation unit 26 observes the actual rotation number at the time of switching, and outputs the actual rotation number together with the effective signal.

The timing of switching from the second stage to the third stage can arbitrarily be decided. For example, the pulse generator 25 can switch to the third stage in the timing of reaching the second target rotation number N2. In this case, the rotation number can be increased stepwise from the second target rotation number N2 to the final target rotation number Nf.

The pulse generator 25 can switch to the third stage when a certain time elapses since the starting of the second stage. In this case, the starting time from the starting to the stabilization to the final target rotation number Nf can be preferably shortened by switching to the third stage irrespective of whether the motor M reaches the second target rotation number N2. Similarly to the case of switching from the first stage to the second stage, the certain time can be set to the time identical to the time interval during which the rotation control is performed by the duty ratio in the pulse generator 25.

In the case that the motor M does not reach the second target rotation number N2 even after the certain time elapses since the starting of the second stage, the pulse generator 25 can also switch to the third stage after the certain time further elapses. In this case, the upper limits of the restriction units 225 and 227 of the second calculator 22 may be increased to reduce the restriction during the additional certain time. In the case that the rotation number does not increase even when the restriction is reduced, because a large load at which the motor M cannot rotate even at the low-speed second target rotation number N2 is applied, the observation unit 26 determines that the motor M is in a locked state. In the case that the rotation number does not increase even when the restriction is reduced, the pulse generator 25 may output the maximum duty ratio of 100% without switching to the third stage until the motor M is determined to be in the locked state.

Fourth Stage

In the embodiment, the pulse generator 25 selects the duty ratio calculated by the fourth calculator 24 at a fourth stage subsequent to the third stage, and generates the pulse signal based on the selected duty ratio.

In the embodiment, when the actual rotation number observed by the observation unit 26 at the third stage reaches the final target rotation number Nf, the pulse generator 25 switches from the third stage to the fourth stage.

Consequently, the rotation control, in which the actual rotation number converges to the final target rotation number Nf and is stabilized at the fourth stage after the rotation number is increased to the final target rotation number Nf at the third stage, can be performed.

Figure 3:
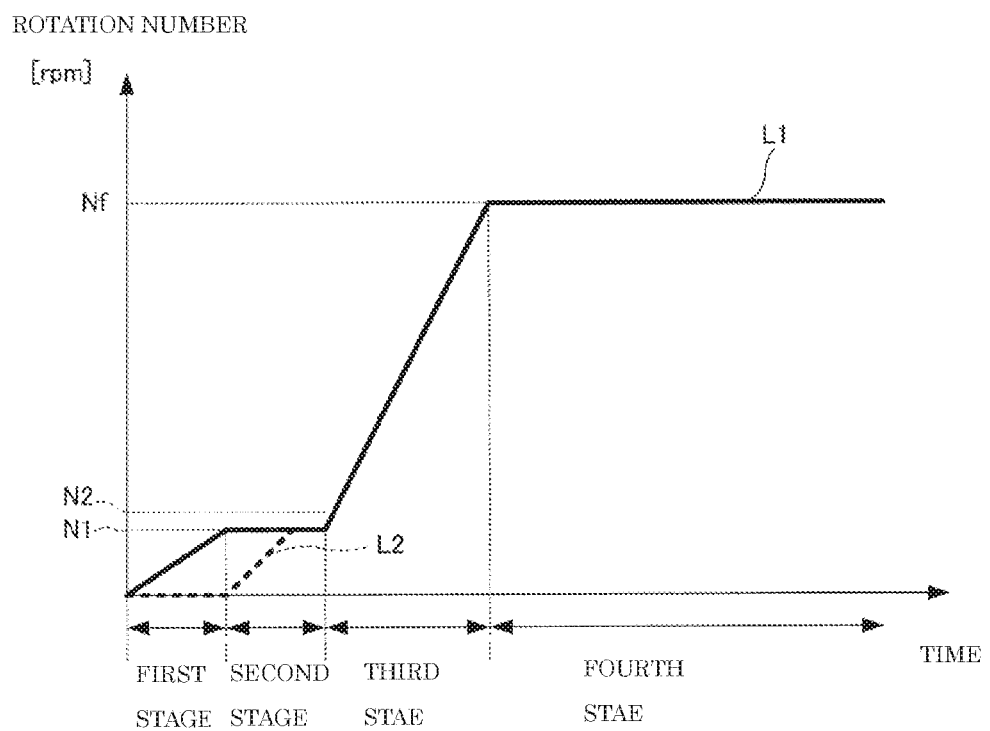
FIG. 3 is a graph illustrating a control example of a rotation number by the controller.

FIG. 3 illustrates a control example of the rotation number by the controller 20.

At the first stage, the duty ratio increases with a constant pattern irrespective of the actual rotation number, and the increasing duty ratio is restricted to the duty ratio with which the motor M is rotated at the first target rotation number N1.

For this reason, as indicated by a line L1 in FIG. 3, even when the rotation number increases at the first stage, the rotation number is restricted to the first target rotation number N1 to suppress the rapid increase of the rotation number.

At the subsequent second stage, the PI control is performed according to the difference between the second target rotation number N2 and the actual rotation number, and the rotation number of the motor M increases. Consequently, at the second stage, the rotation number increases to the vicinity of the second target rotation number N2 as indicated by the line L1. As indicated by a line L2 in FIG. 3, in the case that the rotation number is insufficient at the first stage, the rotation number of shortage is added to the second target rotation number N2 to increase the difference from the actual rotation number, so that the rotation number can be increased at the second stage.

At the subsequent third stage, the PI control is performed according to the difference between the third target rotation number N3 that increases stepwise and the actual rotation number, and the rotation number of the motor M increases gradually. Because the upper limit of the third target rotation number N3 is the final target rotation number Nf, the rotation number increases to the vicinity of the final target rotation number Nf at the third stage as indicated by the line L1.

Because the rotation number increases to the vicinity of the final target rotation number Nf at the third stage, the PI control is performed according to the difference between the final target rotation number Nf and the actual rotation number, and the rotation number of the motor M converges to the final target rotation number Nf at the final fourth stage as indicated by the line L1.

(1) As described above, in the motor unit 1 of the embodiment, the controller 20 has the four control stages in a period in which the motor M is started and then reaches the final target rotation number Nf. The controller 20 generates the pulse signal based on the duty ratio with which the rotation number is increased with a constant pattern with the duty ratio with which the motor M is rotated at the first target rotation number N1 as the upper limit at the first stage. The control can be performed such that the rotation number increases gradually by starting the rotation at a low current using the pattern. Even when the actual rotation number increases due to the rotation control of the first stage, the upper limit can be restricted to the first target rotation number N1, and the rapid increase can be avoided at the beginning of the starting. In the non-rotating state or the low speed rotation state at the beginning of the starting, the rapid increase of the rotation number is easily generated due to the large difference between the final target rotation number Nf and the actual rotation number and the large detection error or large detection delay of the detector 13. However, the actual rotation number is not used to control the rotation number at the first stage.

For this reason, the rapid increase of the rotation number due to the detection error of the actual rotation number can be avoided at the beginning of the starting in which the difference between the final target rotation number Nf and the actual rotation number is large.

(2) At the second stage, the controller 20 increases the rotation number by the feedback control using the actual rotation number. Because the upper limit can be restricted to the second target rotation number N2, the controller 20 can increase the rotation number stepwise from the first target rotation number N1 to the second target rotation number N2 while avoiding the rapid increase of the rotation number.

(3) At the third stage, the controller 20 performs the PI control on the duty ratio according to the difference between the final target rotation number Nf and the actual rotation number. The actual rotation number can be increased to the vicinity of the final target rotation number Nf at the third stage after the rotation number is increased to the rotation number at which sufficient detection accuracy of the actual rotation number is obtained at the first and second stages. For this reason, at the third stage, the feedback control can be performed at the actual rotation number having few detection errors or few detection delays, and the rapid increase of the rotation number due to the detection error or detection delay can be suppressed. The third target rotation number N3 increases stepwise, so that the rotation number can gradually be increased.

(4) At the fourth stage, the controller 20 performs the PI control on the duty ratio according to the difference between the final target rotation number Nf and the actual rotation number. The rotation number that increases to the vicinity of the final target rotation number Nf at the third stage can converge to the final target rotation number Nf and be stabilized at the fourth stage.

(5) When each control stage is switched, the observation unit 26 outputs the effective signal to the calculators 21 to 24. Consequently, the second calculator 22 and the third calculator 23 can calculate the duty ratio increasing the rotation number from the actual rotation number input together with the effective signal, namely, from the last actual rotation number increased at the previous stage. The observation unit 26 can perform the continuous rotation control by taking over the rotation number between the stages, and the generation of vibration or the overshoot can be suppressed at the time of switching the control stage.

(6) In particular, in the case that the Hall element is used to detect the actual rotation number, the detection error is easily generated depending on a positional relationship between the Hall element and the rotor at the starting time, and the detection accuracy is generally lower than that of an encoder or the like. However, even when the Hall element is used, the motor unit 1 of the embodiment can be rotated to the stable final target rotation number Nf while suppressing the rapid increase of the rotation number, and the starting can stably be performed at low cost.

(7) Generally, when the load is small at the time of starting the motor, because the overshoot is easily generated as compared with the case of the large load, it is necessary to set the proportional coefficient for the rotation control according to the load. For this reason, conventionally the specification of the rotation control is changed depending on the load. However, in the embodiment, because the overshoot at the beginning of the starting is suppressed by the rotation control in which the rotation number is constantly increased up to the first target rotation number N1, the rotation control can be performed by the controller 20 having the same configuration irrespective of the magnitude of the load at the starting time, and high versatility is achieved.

(8) In the embodiment, the overshoot and undershoot can be suppressed in the motor M that is a DC motor that is started in a restricted power source capacity by receiving the supply of the AC power.

Although the preferred embodiment of the present disclosure is described above, the present disclosure is not limited to the embodiment, and various modifications and changes can be made within the scope of the present disclosure.

For example, by way of example, the motor M is the three-phase brushless DC motor. Alternatively, the present disclosure can be implemented even when the motor M is a single-phase motor, a brushed motor, or the like.

The present disclosure can be implemented in the case that the pulse signal of a pulse amplitude modulation (PAM) system is generated by the pulse generator 25 and voltage values that are the amplitudes of the pulse signals are calculated as the control values by the calculators 21 to 24. In the case of the PAM system, a power source circuit unit or the like that receives the pulse signal of the PAM system to drive the motor M may be provided in the motor unit 1 as necessary.

In the embodiment, the calculators 21 to 24 restrict the integral term and also restrict the sum of the proportional term and the restricted integral term. Alternatively, one of the integral term and the sum of the proportional term and the restricted integral term may be restricted.

In each of the calculators 21 to 24, the PI control is performed by calculating the sum of the proportional term and the integral term as the duty ratio. Alternatively, PID control, in which a differential term of the difference between the target rotation number and the actual rotation number is further calculated to calculate the sum of the proportional term, the integral term, and the differential term as the duty ratio, may be performed.

The pulse generator 25 of the embodiment generates the pulse signal at each of the four control stages. However, as long as the control value calculated by the first calculator 21 is selected at least at the first stage in the plurality of control stages, the number of control stages is not limited to four. For example, another control stage is added between the second stage and the third stage, and the rotation number may be increased to an xth target rotation number Nx that is greater than or equal to the second target rotation number N2 and less than or equal to the third target rotation number N3 at the added control stage. As the number of control stages increases, the rotation number can gradually be increased, and the overshoot can more easily be avoided. On the other hand, the configuration can be simplified when the number of control stages decreases.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor unit comprising:
a motor;
a controller that outputs a pulse signal controlling a rotation number of the motor; a driver that supplies a drive current to the motor based on the pulse signal; and a detector that observes an actual rotation number of the motor; wherein
the controller includes:
 a plurality of calculators that calculate control values of the rotation number of the motor; and
 a pulse generator including a plurality of control stages in a period in which the motor is started and then reaches a final target rotation number, the pulse generator selecting one of the control values calculated by the plurality of calculators at each of the control stages to generate the pulse signal based on the control value selected;
the plurality of calculators include a first calculator that calculates the control value increasing the rotation number with a constant pattern with the control value rotating the motor at a first target rotation number smaller than the final target rotation number as an upper limit;
the pulse generator selects the control value calculated by the first calculator at a first stage immediately after the starting of the motor;
the first calculator adds an initial value to the control value increasing the rotation number with the constant pattern, and outputs an addition result to the pulse generator, the addition result is used by the controller to drive the motor;
wherein the plurality of calculators further include a second calculator that calculates a sum of a proportional term and an integral term of a difference between a second target rotation number that is greater than or equal to the first target rotation number and is smaller than the final target rotation number and the actual rotation number as the control value; and
the pulse generator selects the control value calculated by the second calculator at a second stage subsequent to the first stage.

2. The motor unit according to claim 1, wherein the pulse generator switches from the first stage to the second stage when a certain time elapses since the starting of the motor.

3. The motor unit according to claim 1, wherein
the plurality of calculators further include a third calculator that calculates a sum of a proportional term and an integral term of a difference between a third target rotation number that increases stepwise with the final target rotation number as an upper limit and the actual rotation number as the control value; and
the pulse generator selects the control value calculated by the third calculator, and generates the pulse signal based on the control value selected, at a third stage subsequent to the second stage.

4. The motor unit according to claim 3, wherein the pulse generator switches to the third stage when a certain time elapses since starting of the second stage.

5. The motor unit according to claim 3, wherein
the plurality of calculators further include a fourth calculator that calculates a sum of a proportional term and an integral term of a difference between the final target rotation number and the actual rotation number as the control value; and
the pulse generator selects the control value calculated by the fourth calculator, and generates the pulse signal based on the control value selected, at a fourth stage subsequent to the third stage.

6. The motor unit according to claim 5, wherein the pulse generator switches from the third stage to the fourth stage when the actual rotation number reaches the final target rotation number at the third stage.

7. The motor unit according to claim 5, wherein when the control value calculated exceeds an upper limit set to the control value, at least one of the second calculator, the third calculator, and the fourth calculator restricts the control value calculated to the upper limit, and outputs the control value calculated to the pulse generator.

8. The motor unit according to claim 5, wherein when the integral term calculated exceeds an upper limit set to the integral term, at least one of the second calculator, the third calculator, and the fourth calculator restricts the integral term calculated to the upper limit, and calculates the sum of the proportional term and the integral term restricted; and when the sum calculated exceeds an upper limit set to the control value, at least one of the second calculator, the third calculator, and the fourth calculator restricts the sum calculated to the upper limit, and outputs the sum calculated as the control value to the pulse generator.

9. The motor unit according to claim 8, wherein the detector calculates the actual rotation number based on a detection signal from a Hall element.

10. The motor unit according to claim 8, further comprising an AC-DC converter, wherein the motor is a DC motor.

\* \* \* \* \*